US012525349B2

(12) United States Patent
Preuhs et al.

(10) Patent No.: US 12,525,349 B2
(45) Date of Patent: Jan. 13, 2026

(54) SYSTEM FOR MONITORING A PHYSIOLOGICAL STATE OF AN OBJECT UNDER EXAMINATION IN REMOTELY CONTROLLED PROCEDURES, METHOD FOR SIGNAL PROVISION ACCORDING TO A PHYSIOLOGICAL STATE OF AN OBJECT UNDER EXAMINATION, AND COMPUTER PROGRAM PRODUCT

(71) Applicant: Siemens Healthcare GmbH, Erlangen (DE)

(72) Inventors: Elisabeth Preuhs, Erlangen (DE); Markus Kowarschik, Erlangen (DE); Christian Kaethner, Freiburg (DE); Marcus Pfister, Bubenreuth (DE); Anne Tjorven Büßen, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 89 days.

(21) Appl. No.: 18/525,030

(22) Filed: Nov. 30, 2023

(65) Prior Publication Data
US 2024/0203582 A1 Jun. 20, 2024

(30) Foreign Application Priority Data
Dec. 14, 2022 (DE) ...................... 10 2022 213 607.1

(51) Int. Cl.
*G16H 40/67* (2018.01)
*G16H 40/20* (2018.01)
*G16H 50/20* (2018.01)

(52) U.S. Cl.
CPC ............. *G16H 40/67* (2018.01); *G16H 40/20* (2018.01); *G16H 50/20* (2018.01)

(58) Field of Classification Search
CPC ......... G16H 40/67; G16H 40/20; G16H 50/20
(Continued)

(56) References Cited

U.S. PATENT DOCUMENTS

| 5,895,371 A | * | 4/1999 | Levitas | ............... | A61M 5/1723 |
| | | | | | 604/67 |
| 6,073,284 A | * | 6/2000 | Borders | ................ | A61G 13/12 |
| | | | | | 607/104 |

(Continued)

FOREIGN PATENT DOCUMENTS

| EP | 1080695 A1 * | 3/2001 | ............. A61B 34/70 |
| JP | 6557558 B2 * | 8/2019 | |
| WO | WO-2022035910 A1 * | 2/2022 | ............. G16H 40/67 |

OTHER PUBLICATIONS

Corindus Vascular Robotics—https://web.archive.org/web/20220221031642/http://www.corindus.com/corpath-grx/how-it-works/ (Stand: Feb. 21, 2022). (1 page).

*Primary Examiner* — Michael Tomaszewski
(74) *Attorney, Agent, or Firm* — Lempia Summerfield Katz LLC (57) ABSTRACT

A system for monitoring a physiological state of an object under examination in remotely controlled procedures includes a remote control unit for remote control of a remote manipulation unit, the remote manipulation unit for performing a procedure step, a capture unit for capturing state data of the object under examination, and a provider unit for classifying the state of the object under examination. When an expected state is present, the remote manipulation unit performs the procedure step. When a deviating state is present, the provider unit provides a remote signal to the remote control unit and a local signal to the output unit, the output unit outputs to local operating personnel a first workflow notice, and the remote control unit adjusts the remote control of the remote manipulation unit, outputs a (Continued)

second workflow notice to the remote operating personnel, and/or provides an alternative remote control signal.

18 Claims, 2 Drawing Sheets

(58) Field of Classification Search
USPC .......................................................... 705/2–3
See application file for complete search history.

(56) References Cited

U.S. PATENT DOCUMENTS

| | | | |
|---|---|---|---|
| 6,491,649 B1* | 12/2002 | Ombrellaro | G16Z 99/00 600/587 |
| 6,557,558 B1 | 5/2003 | Tajima | |
| 6,602,185 B1* | 8/2003 | Uchikubo | A61B 1/0004 606/1 |
| 6,659,939 B2* | 12/2003 | Moll | A61B 34/35 600/102 |
| 8,303,534 B2* | 11/2012 | Hickle | G16H 40/67 604/93.01 |
| 9,298,884 B1* | 3/2016 | Ahmad | G06F 3/0484 |
| 10,638,999 B2* | 5/2020 | Shah | G01S 19/14 |
| 11,011,077 B2* | 5/2021 | Garcia Kilroy | A61B 34/30 |
| 11,464,589 B1* | 10/2022 | Roh | G16H 40/20 |
| 12,064,202 B1* | 8/2024 | Grotenhuis | A61B 34/35 |
| 2003/0046562 A1* | 3/2003 | Uchikubo | A61B 1/0005 713/189 |
| 2006/0178559 A1* | 8/2006 | Kumar | G16H 40/63 600/109 |
| 2007/0043597 A1* | 2/2007 | Donaldson | G16H 10/60 600/437 |
| 2007/0150024 A1* | 6/2007 | Leyde | A61N 1/37258 607/45 |
| 2007/0238925 A1* | 10/2007 | Lee | A61B 34/37 600/106 |
| 2007/0250072 A1* | 10/2007 | Weitzner | A61B 17/1114 606/130 |
| 2008/0119872 A1* | 5/2008 | Brock | A61B 34/30 606/130 |
| 2008/0177281 A1* | 7/2008 | Weitzner | A61B 17/1114 606/167 |
| 2008/0221931 A1* | 9/2008 | Schmidt | G16H 30/20 705/3 |
| 2011/0267418 A1* | 11/2011 | Galindo | G16H 40/67 348/E7.083 |
| 2012/0165661 A1* | 6/2012 | Kemp | A61B 5/0059 600/427 |
| 2013/0030571 A1* | 1/2013 | Ruiz Morales | G06F 3/04847 700/259 |
| 2013/0157239 A1* | 6/2013 | Russo | G09B 23/28 434/262 |
| 2013/0317837 A1* | 11/2013 | Ballantyne | G06F 1/1626 705/2 |
| 2014/0052463 A1* | 2/2014 | Cashman | G16H 40/20 705/2 |
| 2014/0058755 A1* | 2/2014 | Macoviak | G06Q 10/10 705/2 |
| 2014/0067423 A1* | 3/2014 | Joao | G06Q 10/10 705/3 |
| 2014/0081667 A1* | 3/2014 | Joao | G16H 40/63 705/3 |
| 2015/0164331 A1* | 6/2015 | Burgess | A61B 5/0095 601/3 |
| 2015/0302161 A1* | 10/2015 | Van Dooren | G16H 50/30 705/2 |
| 2015/0331997 A1* | 11/2015 | Joao | G16H 10/60 705/3 |
| 2017/0150939 A1* | 6/2017 | Shah | A61M 16/0447 |
| 2019/0005848 A1* | 1/2019 | Garcia Kilroy | G16H 40/67 |
| 2019/0282178 A1* | 9/2019 | Volosin | A61B 5/14532 |
| 2019/0378610 A1* | 12/2019 | Barral | G16H 10/65 |
| 2020/0121556 A1* | 4/2020 | Tian | A61H 39/02 |
| 2020/0126297 A1* | 4/2020 | Tian | G06T 7/0012 |
| 2021/0220064 A1* | 7/2021 | Kottenstette | G16H 20/40 |
| 2021/0241904 A1* | 8/2021 | Durlach | A61B 5/7435 |
| 2021/0378768 A1* | 12/2021 | Olson | A61B 34/20 |
| 2022/0165410 A1* | 5/2022 | Schmidt | G16H 40/40 |
| 2022/0240779 A1* | 8/2022 | Peyman | A61B 5/0066 |
| 2022/0249097 A1* | 8/2022 | Shelton, IV | G16H 50/20 |
| 2022/0384011 A1* | 12/2022 | Shelton, IV | G05B 19/042 |
| 2023/0223142 A1* | 7/2023 | Joao | H04N 7/141 705/2 |
| 2023/0238152 A1* | 7/2023 | Joao | H04N 7/147 705/3 |
| 2023/0326614 A1* | 10/2023 | Kuriel | G16H 50/20 705/2 |
| 2023/0343207 A1* | 10/2023 | Pfister | G08C 25/00 |
| 2023/0352153 A1* | 11/2023 | Kaethner | G16H 40/67 |
| 2023/0368887 A1* | 11/2023 | Roh | G16H 40/67 |
| 2023/0377742 A1* | 11/2023 | Durlach | A61B 5/6892 |
| 2024/0024065 A1* | 1/2024 | Okumu | G06V 20/50 |
| 2024/0038384 A1* | 2/2024 | Kaethner | G06F 21/629 |
| 2024/0203582 A1* | 6/2024 | Preuhs | G16H 40/67 |
| 2025/0000466 A1* | 1/2025 | Regensburger | A61B 6/487 |
| 2025/0017541 A1* | 1/2025 | Birkhold | A61B 6/5211 |

* cited by examiner

SYSTEM FOR MONITORING A PHYSIOLOGICAL STATE OF AN OBJECT UNDER EXAMINATION IN REMOTELY CONTROLLED PROCEDURES, METHOD FOR SIGNAL PROVISION ACCORDING TO A PHYSIOLOGICAL STATE OF AN OBJECT UNDER EXAMINATION, AND COMPUTER PROGRAM PRODUCT

This application claims the benefit of German Patent Application No. 10 2022 213 607.1, filed on Dec. 14, 2022, which is hereby incorporated by reference in its entirety.

BACKGROUND

The present embodiments relate to a system for monitoring a physiological state of an object under examination in remotely controlled procedures, to a method for signal provision according to a physiological state of an object under examination, and to a computer program product.

In minimally invasive interventions, therapies such as stent placement or diagnoses such as detecting stenoses may be carried out by medical objects introduced into the body. These medical objects may be fed in through an access point in the groin (e.g., in the femoral artery) or in the left armpit (e.g., radial accesses via the subclavian artery) as far as an insertion location using guide wires and catheters. Navigation into the individual vessel branches may be achieved by rotating and feeding in the guide wire or catheter at the entry point.

If such procedures are then assisted by a robotic movement apparatus (e.g., a catheter robot and/or a vascular navigation robot), the movement apparatus may take over the manipulation of the medical object, controlled remotely by medical operating personnel (e.g., a doctor).

Depending on the application, the medical operating personnel may be in the same room as the movement apparatus or in an equivalent room in a hospital located far away. In the second case, two people or groups may work together in "distributed" teams: local operating personnel in situ at the object under examination, and remote operating personnel for controlling the movement apparatus remotely. The local and/or remote operating personnel may also include just one person.

Various aids may be employed to facilitate or assist communication between distributed teams during a remote procedure. For example, bidirectional real-time image transmissions, additional information (e.g., about medical instruments currently being used or the positioning thereof), and vital signs of the object under examination may be provided.

Nonetheless, situations may arise in which "limited perception" by the remote operating personnel may have a negative impact on the object under examination (e.g., acute medical emergencies for the object under examination during the procedure, such as cardiac arrest and/or a drop in blood pressure and/or shock reactions and/or panic attacks and/or intraoperative strokes and/or perforations and/or hemorrhages and/or vasospasms of the object under examination, such as caused by a catheter).

In such situations, the (e.g., potentially inexperienced) local operating personnel may be left entirely on their own, because there is no assistance from the experienced but off-site remote operating personnel.

SUMMARY AND DESCRIPTION

The scope of the present invention is defined solely by the appended claims and is not affected to any degree by the statements within this summary.

The present embodiments may obviate one or more of the drawbacks or limitations in the related art. For example, assistance to local operating personnel in medical emergency situations of an object under examination may be provided.

Independent of the grammatical term usage, individuals with male, female, or other gender identities are included within the term.

In a first aspect, the present embodiments relate to a system for monitoring a physiological state of an object under examination in remotely controlled procedures. The system includes a capture unit, a provider unit, a remote control unit, a remote manipulation unit, and an output unit. The remote control unit is configured to capture a user input by remote operating personnel. The remote control unit is also configured to provide a remote control signal to the remote manipulation unit according to the user input. The remote manipulation unit is configured to perform, at the object under examination, at least one procedure step according to the remote control signal. The capture unit is configured to capture and provide to the provider unit state data of the object under examination. The state data includes information about the physiological state of the object under examination. The provider unit is configured to classify, based on the state data, the physiological state of the object under examination into an expected state or a state that deviates therefrom. In a first operating state of the system, when the expected state is present, the remote manipulation unit performs the at least one procedure step according to the remote control signal. In a second operating state of the system, when the deviating state is present, the provider unit provides a remote signal to the remote control unit and a local signal to the output unit. The output unit outputs to local operating personnel a first workflow notice according to the local signal. In addition, the remote control unit adjusts degrees of freedom for the remote control of the remote manipulation unit, outputs a second workflow notice to the remote operating personnel, and/or provides an alternative remote control signal. The remote control unit is located away from the remote manipulation unit in both operating states of the system.

The remote control unit may include a user interface (e.g., an input unit and a further output unit, such as a display unit). The input unit may be configured to capture the user input by the remote operating personnel. For example, the input unit may be a keyboard and/or a button and/or a joystick and/or a touchpad and/or a microphone (e.g., for speech recognition) and/or a camera (e.g., for capturing gestures). The display unit may be integrated (e.g., when there is a resistive and/or capacitive input display (touchscreen)). The remote control unit is located away from (e.g., spatially and/or physically distanced from) the remote manipulation unit (e.g., in another room or building). The remote control unit may provide the remote control signal to the remote manipulation unit according to the user input. The remote manipulation unit may be configured to receive the remote control signal from the remote control unit. In addition, the remote manipulation unit may be controlled remotely by the remote control unit (e.g., using the remote control signal). The remote manipulation unit is configured to perform, at the object under examination, the at least one procedure step according to the remote control signal. For example, the object under examination may be a human and/or animal patient and/or an examination phantom.

The remote manipulation unit (e.g., a telemanipulation unit) may include a medical device that is configured for moving (e.g., robotically) the object under examination (e.g., may be a patient positioning apparatus) and/or for moving the medical object robotically (e.g., a catheter robot and/or a surgical robot) and/or for medical imaging (e.g., a medical imaging device, such as a medical X-ray device and/or a computed tomography facility (CT facility) and/or a magnetic resonance tomography facility (MRT facility) and/or an ultrasound device and/or a positron emission tomography facility (PET facility)) and/or for treating the object under examination (e.g., an automatic injector and/or a radiotherapy facility and/or a brachytherapy device and/or a ventilator and/or a histotripsy device).

The at least one procedure step may include, for example, a treatment step and/or an examination step on the object under examination. For example, the at least one procedure step may include administering a medication. Alternatively or additionally, the at least one procedure step may include arranging and/or moving and/or manipulating a medical object (e.g., a medical, such as diagnostic and/or surgical, instrument) and/or an implant, on and/or in the object under examination. Alternatively or additionally, the at least one procedure step may include acquiring medical image data of the object under examination by a medical imaging device. Alternatively or additionally, the at least one procedure step may include treating at least one treatment region of the object under examination (e.g., carrying out an ultrasound, brachytherapy, shockwave, and/or radiotherapy procedure).

The remote control signal may include at least one instruction and/or at least one command (e.g., a plurality of instructions and/or commands; a sequence of instructions and/or commands that cause the remote manipulation unit to perform the at least one procedure step).

The capture unit may include at least one sensor (e.g., an optical and/or acoustic and/or electromagnetic and/or mechanical sensor) that is configured to capture the state data of the object under examination (e.g., a camera and/or a heart sensor and/or a respiratory sensor and/or a heart rate sensor and/or a temperature sensor). The state data includes information about the physiological state of the object under examination (e.g., includes a physiological patient parameter). The state data may characterize quantitatively and/or qualitatively the, for example, current physiological state of the object under examination. The capture unit (e.g., the at least one sensor) may be located on the object under examination, in the object under examination, or spaced from the object under examination. In one embodiment, the capture unit may provide the state data to the provider unit (e.g., using of a state signal).

The provider unit may be configured to receive the state data from the capture unit. The provider unit may also be configured to classify the physiological state of the object under examination, which state is characterized by the state data, into an expected state or a state that deviates therefrom. The expected state may describe a healthy or situationally appropriate state of the object under examination. For example, the situationally appropriate state may be determined based on medical history data and/or pre-procedurally captured data (e.g., image data and/or pre-procedural physiological patient parameters) of the object under examination. In one embodiment, the physiological state of the object under examination may be classified, based on the state data (e.g., by comparing the state data with the medical history data and/or the pre-procedurally captured data), as an expected state or a state that deviates therefrom (e.g., an acute emergency state).

Two different operating states of the system may be established according to a result of the classification of the physiological state of the object under examination. In the first operating state of the system (e.g., when an expected state of the object under examination is present), the remote manipulation unit performs the at least one procedure step according to the remote control signal. For example, the performing of the at least one procedure step by the remote manipulation unit may be enabled when the expected state is present. In the second operating state of the system (e.g., when the deviating state of the object under examination is present), the provider unit provides the remote signal to the remote control unit and the local signal to the output unit.

The remote signal and/or the local signal may each present information about the deviating state (e.g., about the current state data of the object under examination).

The first workflow notice may include information about the (e.g., current) physiological state of the object under examination (e.g., the emergency state) and/or about stabilizing the object under examination. For example, the first workflow notice may be in the form of text and/or speech and/or symbols and/or present a graphic. The output unit may be configured for visual and/or audible and/or haptic output of the first workflow notice to the local operating personnel (e.g., using a local display unit and/or a loudspeaker and/or a motor). For this purpose, the output unit may be in situ (e.g., in spatial and/or physical proximity to the local operating personnel, such as in the same room as the local operating personnel).

The remote control unit may be configured to adjust according to the remote signal the degrees of freedom for the remote control of the remote manipulation unit. For example, the remote control unit may reduce (e.g., restrict) or extend according to the remote signal the degrees of freedom for remote control of the remote manipulation unit. The degrees of freedom for remote control of the remote manipulation unit may include, for example, configuring the remote manipulation unit and/or variable operating parameters and/or movement parameters of the remote manipulation unit.

Alternatively or additionally, in the second operating state of the system, the remote control unit may output to the remote operating personnel the second workflow notice according to the remote signal. The second workflow notice may include information about the (e.g., current) physiological state of the object under examination (e.g., the emergency state) and/or about stabilizing the object under examination. For example, the second workflow notice may be in the form of text and/or speech and/or symbols and/or present a graphic. The remote control unit may be configured for visual and/or audible and/or haptic output of the second workflow notice (e.g., by a display unit and/or a loudspeaker and/or a motor). The remote operating personnel may be notified by the second workflow notice about the deviating state (e.g., the emergency state) of the object under examination.

The first and/or second workflow notice may also each include an instruction for stabilizing the object under examination (e.g., for assisting in and/or initiating respective, coordinated, emergency measures) by the local operating personnel and the remote operating personnel. For example, the first workflow notice and/or the second workflow notice may include information about an emergency standard operating procedure (SOP) and/or emergency guideline for stabilizing the object under examination. This may assist the local operating personnel and/or the remote operating personnel in stabilizing the object under examination.

Alternatively or additionally, in the second operating state of the system, the remote control unit may provide the alternative remote control signal (e.g., to the remote manipulation unit). The alternative remote control signal may have, for example, all the features and attributes of the remote control signal, and vice versa.

The alternative remote control signal may include at least one instruction and/or at least one command (e.g., a plurality of instructions and/or commands, such as a sequence of instructions and/or commands, that cause the remote manipulation unit to perform a safety movement, such as a movement retracting the medical object and/or removal of the medical object, and/or an evasive movement, such as an evasive movement that allows unobstructed access to the object under examination) and/or a further procedure step. The further procedure step may have, for example, all the features and attributes of the at least one procedure step. For example, the further procedure step may include capturing data (e.g., medical image data) from the object under medical examination. The data may assist the medical operating personnel (e.g., the local and/or remote operating personnel) in diagnosing the deviating state (e.g., the emergency state) of the object under examination. For example, when a perforation and/or dissection is indicated from physiological parameters of the object under examination, a perfusion CT may be initiated as the further procedure step.

The embodiment may facilitate monitoring of the physiological state of the object under examination, where, when a state is present that deviates from the expected state, the local signal may be used to inform and/or assist the local operating personnel. In addition, when the deviating state is present, the remote operating signal may be used to inform and/or assist the remote operating personnel, and/or to adjust the remote control of the remote manipulation unit.

In a further embodiment of the system, the provider unit may be configured to classify the physiological state of the object under examination by comparing the state data with reference parameters, by a statistical analysis of the state data, by comparing the state data with historical state data of the object under examination, and/or by applying artificial intelligence to the state data.

The provider unit may be configured to compare the state data with reference parameters and/or historical state data of the object under examination. The reference parameters may present reference values for the state data that depend on the object or are adapted to the object under examination (e.g., reference values ascertained statistically or based on models). The historical state data may have been captured pre-procedurally (e.g., before the start of the procedure) and may model the physiological state of the object under examination pre-procedurally. The provider unit may be configured to compare the state data with the reference parameters and/or the historical state data. The provider unit may also be configured to identify, based on the comparison (e.g., when a deviation is identified), the state of the object under examination that deviates from the expected state.

Alternatively or additionally, the provider unit may be configured for statistical analysis of the state data (e.g., a variance and/or standard deviation and/or a variation over time). In addition, the provider unit may identify, using the statistical analysis (e.g., if the variance and/or standard deviation and/or variation over time reaches or exceeds a set threshold value), the deviating state of the object under examination.

Alternatively or additionally, the provider unit may be configured to apply artificial intelligence (e.g., a trained function) to the state data as input data. By applying the trained function to the state data as input data, the physiological state of the object under examination may be classified (e.g., into the expected state or state deviating therefrom). The input data may be based on the state data (e.g., may include the state data). In addition, the trained function may provide information about the classification of the physiological state of the object under examination as output data. The trained function may be trained by a machine learning method. For example, the trained function may be a neural network (e.g., a convolutional neural network (CNN)) or a network including a convolutional layer.

The trained function maps input data onto output data. The output data may also depend on one or more parameters of the trained function. The one or more parameters of the trained function may be determined and/or adapted by training. Determining and/or adapting the one or more parameters of the trained function may be based, for example, on a pair composed of training input data and associated training output data (e.g., comparison output data). The trained function is applied to the training input data to generate training mapping data. For example, the determining and/or adapting may be based on a comparison of the training mapping data and the training output data (e.g., the comparison output data). In general, a trainable function (e.g., a function containing one or more parameters yet to be adapted) is also referred to as a trained function.

Other terms for trained functions are trained mapping rule, mapping rule containing trained parameters, function containing trained parameters, algorithm based on artificial intelligence, and machine-learning algorithm. An example of a trained function is an artificial neural network, where the edge weights of the artificial neural network are equivalent to the parameters of the trained function. The term "neural net" may also be used instead of the term "neural network". For example, a trained function may also be a deep artificial neural network (e.g., deep neural network). Another example of a trained function is a "support vector machine," and, for example, other machine-learning algorithms may also be used as the trained function.

The trained function (e.g., the neural network) may have an input layer and an output layer. The input layer of the trained function may be configured to receive the input data. In addition, the output layer may be configured to provide mapping data (e.g., output data). In addition, the input layer and/or the output layer may each include a plurality of channels (e.g., neurons).

In one embodiment, at least one parameter of the trained function may be adapted based on a comparison of a training classification with a comparison classification of a training state.

The embodiment may facilitate reliable classification of the physiological state of the object under examination.

In a further embodiment of the system, the state data may include medical image data and/or a physiological signal (e.g., a respiratory signal and/or an ECG signal) of the object under examination. In this case, the provider unit may be configured to identify (e.g., to detect, such as automatically), from the state data, a cardiac arrest and/or cardiac fibrillation and/or a drop in blood pressure and/or a shock reaction and/or a panic attack and/or a stroke and/or a perforation and/or a hemorrhage and/or a vasospasm as a deviating state of the object under examination.

In one embodiment, the capture unit may include a medical imaging device for acquiring the medical image data of the object under examination. The medical image data may depict the object under examination intra-procedurally (e.g., in two-dimensional or three-dimensional spatial resolution). In addition, the medical image data may depict the object under examination in time resolution. The medical imaging device may include, for example, a medical X-ray device and/or a CT facility and/or an MRT facility and/or an ultrasound device and/or a PET facility. Alternatively or additionally, the capture unit may include a sensor for capturing (e.g., intra-procedurally) the physiological signal from the object under examination (e.g., an ECG sensor and/or a respiratory sensor and/or a motion sensor and/or a temperature sensor).

For example, a cardiac arrest may be identified from a flatline in an ECG signal. In addition, cardiac fibrillation may be identified from irregular R waves and/or missing P waves in the ECG. Further, a drop in blood pressure may be identified from a brief loss of consciousness and/or elevated pulse rate and/or a fall in a blood pressure level of the object under examination. In addition, a shock reaction and/or panic attack may be identified from a loss of consciousness and/or an elevated pulse rate and/or an irregular heartbeat and/or irregular breathing and/or a reduced oxygen saturation level in the blood of the object under examination. For example, a pulse oximeter may be used to capture the oxygen saturation level in the blood of the object under examination. Further, a perforation and/or bleeding and/or a stroke may be identified from CT and/or MRT imaging and/or CT-perfusion imaging of the object under examination.

The embodiment may facilitate specific identification of the deviating state. This may allow specific (e.g., targeted) information and/or instructions for the local and remote operating personnel based on the respective signals (e.g., the local signal and the remote signal) for stabilizing the object under examination.

In a further embodiment of the method, the provider unit may be configured to identify, based on the state data, specific local operating personnel and/or a configuration requirement, including information about required materials and/or a required room-space, and/or a further procedure step for stabilizing the object under examination. The provider unit may also be configured to provide the local signal presenting information on the identification of the specific local operating personnel and/or the configuration requirement and/or the further procedure step. The output unit may be configured to output the first workflow notice presenting identification of the specific local operating personnel and/or the configuration requirement and/or the further procedure step. Alternatively or additionally, the output unit may be configured to output an advice notice to the specific local operating personnel and/or to a reservation system for reserving the configuration requirement.

In one embodiment, the provider unit may receive and/or capture information (e.g., a suitability parameter and/or positioning information) about the local operating personnel (e.g., information about each person of a plurality of people from the local operating personnel). For example, the provider unit may be configured to capture the information about the local operating personnel from a user input using an input unit. Alternatively or additionally, the provider unit may be configured to receive the information about the local operating personnel from a data storage unit (e.g., a database). The provider unit may also be configured to identify, based on the state data (e.g., when a deviating state of the object under examination is present), specific local operating personnel (e.g., one or more specific people from the local operating personnel). In this case, the identification of the specific local operating personnel may be based on the information about the local operating personnel (e.g., the suitability parameter and/or the positioning information). The provider unit may identify, based on the state data, a specific emergency state of the object under examination. Based on the suitability parameter and/or the positioning information of the local operating personnel, the provider unit may identify the specific local operating personnel suitable for stabilizing the object under examination. For example, identifying the specific local operating personnel may bring in further experts for stabilizing the object under examination. The provider unit may, for example, assess the suitability and/or competence of the local operating personnel from the suitability parameter, and/or determine from the positioning information a response time until the local operating personnel reach the object under examination.

The provider unit may also be configured to identify, based on the state data, the configuration requirement. The configuration requirement may include information about required materials needed for stabilizing the object under examination (e.g., medication and/or a medical object and/or a medical device, such as a defibrillator) and/or about a required room space (e.g., a specific operating room and/or an intervention room and/or an intensive care unit and/or a resuscitation room and/or a specifically equipped room).

Alternatively or additionally, the provider unit may receive and/or capture information (e.g., an occupancy parameter and/or an equipment parameter) about a plurality of room spaces (e.g., information about each room space of the plurality of room spaces). For example, the provider unit may be configured to capture the information about the room space from a user input using an input unit. Alternatively or additionally, the provider unit may be configured to receive the information about the room space from a data storage unit (e.g., a database). The provider unit may also be configured to identify, based on the state data (e.g., when a deviating state of the object under examination is present), a required room space (e.g., a specific room space from the plurality of room spaces). In this case, the identification of the required room space may be based on the information about the room spaces (e.g., the occupancy parameter and/or the equipment parameter). The provider unit may identify, based on the state data, a specific emergency state of the object under examination. Based on the occupancy parameter and/or the equipment parameter of the rooms spaces, the provider unit may identify the required room space suitable for stabilizing the object under examination. The provider unit may, for example, identify an availability from the occupancy parameter, and/or a suitability of the room space from the equipment parameter.

Alternatively or additionally, the provider unit may be configured to identify, based on the state data, a further procedure step for stabilizing the object under examination. The further procedure act may have, for example, all the features and attributes of the at least one procedure step. The provider unit may be configured to identify, based on the state data, the further procedure step from a plurality of further procedure steps, and/or to configure same based on the state data.

In one embodiment, the provider unit may provide, in the second operating state of the system, the local signal presenting information on the identification of the specific local operating personnel, the configuration requirement, and/or the further procedure step.

The output unit may be configured to output the first workflow notice presenting the identification of the specific local operating personnel and/or the configuration requirement and/or the further procedure step (e.g., in the form of text and/or speech and/or symbols and/or as a graphic). Alternatively or additionally, the output unit may be configured to output an advice notice to the specific local operating personnel and/or to a reservation system for reserving the configuration requirement. The output unit may be configured to output the advice notice as an electronic signal (e.g., an electronic message and/or call and/or calendar entry) to the specific local operating personnel (e.g., to a communications unit carried by the specific local operating personnel, such as a cell phone) and/or to the reservation system. The specific local operating personnel may thereby be informed about the identification for stabilizing the object under examination. In addition, the configuration requirement may be reserved in the reservation system (e.g., may be pre-allocated or allocated) for stabilizing the object under examination.

The embodiment may facilitate automatic activation of a chain of survival (e.g., a local chain of survival) for stabilizing the object under examination. This may assist the local operating personnel in stabilizing the object under examination.

In a further embodiment of the system, the remote control unit may be configured to reduce the number of degrees of freedom for remote control of the remote manipulation unit or to block the remote control of the remote manipulation unit, according to the remote signal.

The remote control unit may be configured to adjust (e.g., reduce or extend), according to the remote signal, the number of degrees of freedom for the remote control of the remote manipulation unit. The degrees of freedom for remote control of the remote manipulation unit may include, for example, configuring the remote manipulation unit (e.g., replacing an instrument) and/or variable operating parameters and/or movement parameters of the remote manipulation unit. In one embodiment, the remote control unit may be configured to restrict, on identification of the deviating state of the object under examination, the degrees of freedom for remote control of the remote manipulation unit to the degrees of freedom needed for stabilizing the object under examination. This may facilitate remote control of the remote manipulation unit that is focused on stabilizing the object under examination.

Alternatively, the remote control unit may be configured to block, according to the remote signal (e.g., on identification of the deviating state of the object under examination), the remote control of the remote manipulation unit (e.g., temporarily). This may provide that remotely controlled procedure steps by the remote manipulation unit do not hinder or interrupt the local operating personnel in stabilizing the object under examination (e.g., when the remote operating personnel cannot contribute to stabilizing the object under examination by remote control of the remote manipulation unit).

In a further embodiment of the system, the provider unit may be configured to identify, based on the state data, a further procedure step for stabilizing the object under examination. The provider unit may also be configured to provide the remote signal presenting information on the identification of the further procedure step. In one embodiment, the remote control unit may be configured to output the second workflow notice presenting the identification of the further procedure step. Alternatively or additionally, the remote control unit may be configured to provide the alternative remote control signal for controlling the remote manipulation unit remotely to perform the further procedure step.

The further procedure step may have, for example, all the features and attributes of the at least one procedure step. The provider unit may be configured to identify, based on the state data, the further procedure step from a plurality of further procedure steps, and/or to configure same based on the state data. The further procedure step may include a treatment and/or examination step for stabilizing the object under examination. For example, the further procedure step may include administering a medication (e.g., atropine and/or adrenaline).

In one embodiment, the provider unit may provide, in the second operating state of the system, the remote signal presenting information on the identification of the further procedure step. The remote control unit may be configured to output to the remote operating personnel the second workflow notice presenting the identification of the further procedure step (e.g., in the form of text and/or speech and/or symbols and/or as a graphic).

Alternatively or additionally, the remote control unit may be configured to provide, according to the remote signal (e.g., based on the information on the identification of the further procedure step), the alternative remote control signal for controlling the remote manipulation unit remotely to perform the further procedure step. The remote control signal may include at least one instruction and/or at least one command (e.g., a plurality of instructions and/or commands, such as a sequence of instructions and/or commands that cause the remote manipulation unit to perform the further procedure step).

The embodiment may facilitate assisting the remote operating personnel in controlling the remote manipulation unit remotely to stabilize the object under examination.

In a further embodiment of the system, the system may also include a local input unit. The local input unit may be configured to capture and provide to the provider unit a user input by the local operating personnel. The provider unit may be configured to classify, according to the user input by the local operating personnel, the physiological state of the object under examination as a deviating state.

For example, the local input unit may be a keyboard and/or a button and/or a joystick and/or a touchpad and/or a microphone (e.g., for speech recognition) and/or a camera (e.g., for capturing gestures). In one embodiment, the output unit may additionally have a local display unit. The local input unit may be integrated in the local display unit (e.g., when there is a resistive and/or capacitive input display). The local input unit may be configured to capture the user input by the local operating personnel. For this purpose, the local input unit may be in situ (e.g., in spatial and/or physical proximity to the local operating personnel, such as in the same room as the local operating personnel). The local input unit may also be configured to provide to the provider unit the captured user input by the local operating personnel.

The provider unit may classify, according to the user input by the local operating personnel (e.g., when there is user input by the local operating personnel), the physiological state of the object under examination as a deviating state. For example, the user input by the local operating personnel may include information about the current physiological state of the object under examination (e.g., about the classification of the physiological state of the object under examination). Alternatively, the local operating personnel, by providing the user input, may classify the current physiological state of the object under examination (e.g., manually) as a deviating state.

The embodiment may facilitate manual classification of the physiological state of the object under examination by the local operating personnel.

In a further embodiment of the system, the provider unit may be configured to classify the physiological state of the object under examination additionally based on the user input by the remote operating personnel.

In one embodiment, the user input by the remote operating personnel may include information about the current physiological state of the object under examination (e.g., about the classification of the physiological state of the object under examination). Alternatively, the remote operating personnel, by providing a dedicated user input, may classify the current physiological state of the object under examination (e.g., manually) as a deviating state.

The embodiment may facilitate manual classification of the physiological state of the object under examination by the remote operating personnel.

In a further embodiment of the system, the capture unit may be configured additionally to capture protocol data from a medical device and/or from the remote manipulation unit and/or to capture a current procedure step. The provider unit may be configured to classify the physiological state of the object under examination additionally based on the protocol data and/or the current procedure step.

The protocol data may include configuration information about a configuration of the medical device and/or the remote manipulation unit for performing the at least one procedure step. Alternatively or additionally, the capture unit may be configured to capture (e.g., identify) the current procedure step. The provider unit may be configured to determine, based on the protocol data and/or the current procedure step, the expected state (e.g., expected pain and/or expected panic and/or expected movement) of the object under examination. Hence, the provider unit may be configured to classify the physiological state of the object under examination additionally based on the protocol data and/or the current procedure step.

For example, it may be identified from the protocol data that the object under examination is currently not sedated and thus is sensitive to pain. Further, the identification of the current workflow step (e.g., pulling out a blood clot) may be used to identify a painful and/or unpleasant state as an expected state of the object under examination.

This may facilitate improved identification of the deviating state.

In a further embodiment of the system, the remote manipulation unit may include a medical imaging device and/or a medical treatment device and/or a movement apparatus for robotic movement of a medical object.

The remote manipulation unit may include a movement apparatus for robotic movement of the medical object (e.g., a catheter robot and/or a surgical robot). For example, the medical object may include a surgical and/or diagnostic instrument (e.g., a catheter and/or guide wire and/or an endoscope) and/or an implant. Alternatively or additionally, the remote manipulation unit may include a medical imaging device for acquiring medical image data of the object under examination (e.g., a medical X-ray device and/or a CT facility and/or an MRT facility and/or an ultrasound device and/or a PET facility). Alternatively or additionally, the remote manipulation unit may include a medical treatment device for treating the object under examination (e.g., an automatic injector and/or a radiotherapy facility and/or a brachytherapy device and/or a ventilator and/or a histotripsy device).

The embodiment may facilitate monitoring of the physiological state of the object under examination while the at least one remotely controlled procedure step is being performed by the movement apparatus and/or the imaging device and/or the treatment device.

In a second aspect, the present embodiments relate to a method for signal provision according to a physiological state of an object under examination. In this method, information on a classification of the physiological state of the object under examination is received. The classification classifies the state of the object under examination as an expected state or a state that deviates therefrom. When the expected state is present, a remote control signal, which presents information on at least one procedure step, is provided to a remote manipulation unit. When the deviating state is present, a local signal is provided to an output unit. In this case, a first workflow notice is output by the output unit to local operating personnel according to the local signal. In addition, a remote signal is provided to a remote interference unit. Degrees of freedom for the remote control of the remote manipulation unit are adjusted, a second workflow is output to remote operating personnel, and/or an alternative remote control signal is provided.

The receiving of the information about the classification of the physiological state of the object under examination may include capturing and/or reading a computer-readable data storage medium (e.g., a database). Alternatively or additionally, the information about the classification of the physiological state of the object under examination may be captured from a user input by medical operating personnel (e.g., the remote operating personnel and/or the local operating personnel).

The advantages of the method are essentially the same as the advantages of the system. Features, advantages, or alternative embodiments mentioned in this connection may also be applied to the other subject matter, and vice versa.

In a further embodiment of the method, state data of the object under examination that includes information about the physiological state of the object under examination may be received. Specific local operating personnel and/or a configuration requirement, including information about required materials and/or a required room space, and/or a further procedure step for stabilizing the object under examination may be identified from the state data. When the deviating state is present, the local signal, which presents information on the identification of the specific local operating personnel and/or the configuration requirement and/or the further procedure step, may be provided. In addition, the first workflow notice, which presents the identification of the specific local operating personnel and/or the configuration requirement and/or the further procedure step and/or an advice notice to the specific local operating personnel and/or to a reservation system for reserving the configuration requirement, may be output.

In a further embodiment of the method, the number of degrees of freedom for remote control of the remote manipulation unit may be reduced, or the remote control of the remote manipulation unit may be blocked, according to the remote signal.

In a further embodiment of the method, state data of the object under examination that includes information about the physiological state of the object under examination may be received. A further procedure act for stabilizing the object under examination may be identified from the state data. The remote signal presenting information on the identification of the further procedure step may be provided. In addition, the second workflow notice presenting the identification of the further procedure step may be output, and/or the alternative remote control signal presenting information on the further procedure step may be provided to the remote manipulation unit.

In a third aspect, the present embodiments relate to a computer program product having a computer program that may be loaded directly into a memory of a provider unit, and contains program segments in order to perform all the acts of the proposed method for signal provision when the program segments are executed by the provider unit. The computer program product may include software containing a source code that still needs to be compiled and linked or just needs to be interpreted, or an executable software code that, for execution, only needs to be loaded into the provider unit. The method for signal provision by a provider unit may be performed quickly, reproducibly, and robustly by the computer program product. The computer program product is configured such that the computer program product may perform the method acts according to the present embodiments using the provider unit. Such a computer program product may include, in addition to the computer program, if applicable, extra elements such as, for example, documentation and/or extra components, and also hardware components such as, for example, hardware keys (e.g., dongles etc.) for using the software.

The advantages of the computer program product are essentially the same as the advantages of the method for signal provision. Features, advantages, or alternative embodiments mentioned in this connection may also be applied to the other subject matter, and vice versa.

The present embodiments may also be based on a computer-readable storage medium (e.g., a non-transitory computer-readable storage medium) and/or electronically readable data carrier, on which program segments that may be read and executed by a provider unit in order to perform all the acts of the method for signal provision when the program segments are executed by the provider unit are stored. An implementation largely in software has the advantage that even provider units already in use may be easily upgraded by a software update in order to work in the manner according to the present embodiments.

BRIEF DESCRIPTION OF THE DRAWINGS

Embodiments of the invention are described in more detail below and illustrated in the drawings. The same reference signs are used for the same features in different figures, in which.

DETAILED DESCRIPTION

Figure 1:
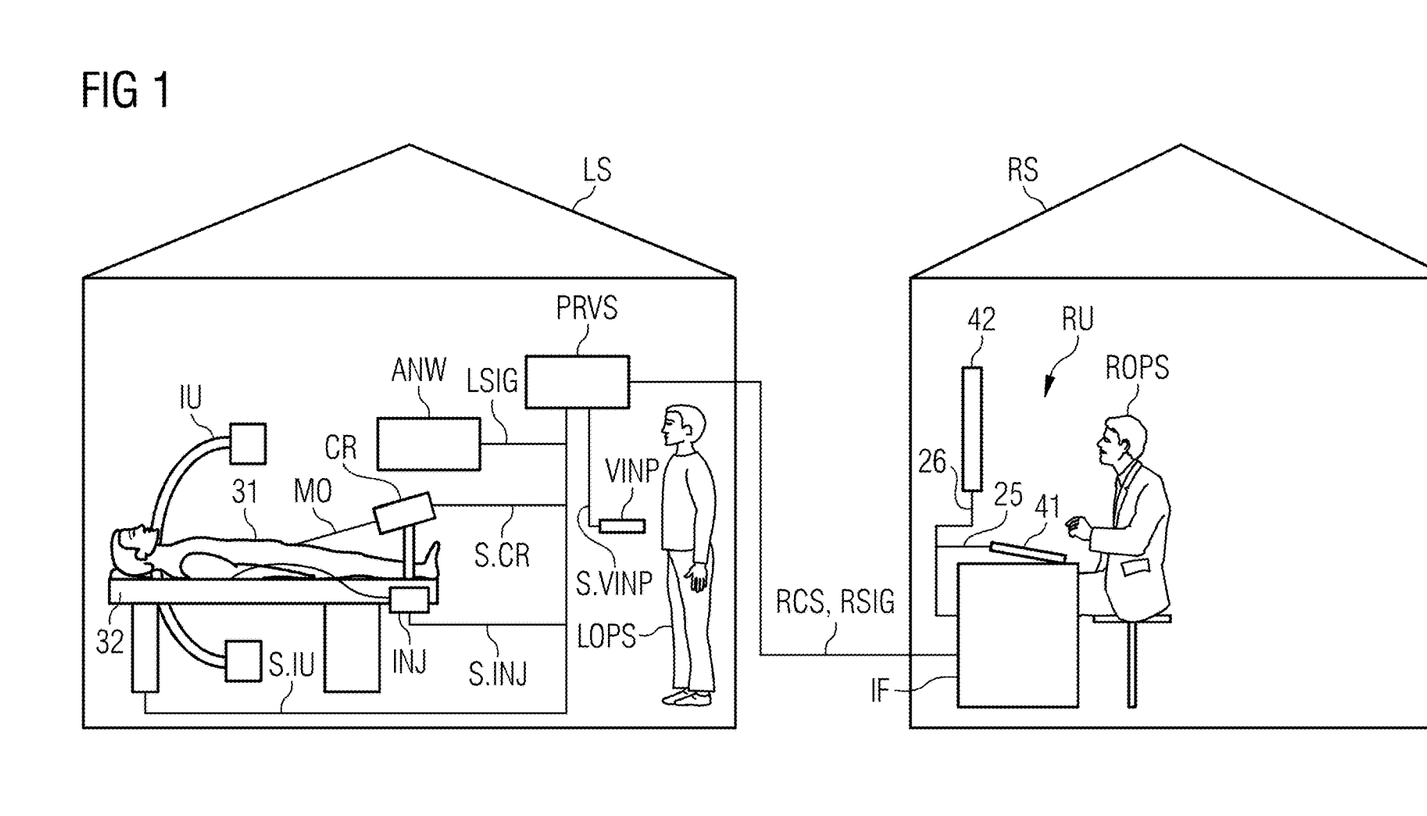
FIG. 1 shows a schematic representation of one embodiment of a system.

FIG. 1 shows schematically an embodiment of a system for monitoring a physiological state of an object under examination in remotely controlled procedures. The system may include a capture unit, a provider unit PRVS (e.g., including one or more processors), a remote control unit RU, and an output unit ANW.

As illustrated in FIG. 1, an object under examination 31 on a patient positioning apparatus 32 is located together with a remote manipulation unit in a local treatment room LS. The remote manipulation unit may include a medical imaging device (e.g., a medical C-arm X-ray device IU), and/or a medical treatment device (e.g., an automatic injector INJ), and/or a movement apparatus CR for robotic movement of a medical object MO. In addition, the remote manipulation unit (e.g., the C-arm X-ray device IU, the movement apparatus CR, and the automatic injector INJ) may be configured to perform at least one procedure step on the object under examination according to a remote control signal RCS provided by the remote control unit RU. The movement apparatus CR (e.g., a catheter robot) may be communicatively coupled by a signal S.CR, and the automatic injector INJ by a signal S.INJ, to the provider unit PRVS. The movement apparatus CR may be configured to robotically move a medical object MO (e.g., a catheter and/or surgical instrument) that, in an operating state of the system, is located at least partially in the object under examination 31. The automatic injector INJ may be configured to administer a medication (e.g., a contrast agent).

The remote control unit RU may be spatially and physically distanced from the object under examination 31 and from the remote manipulation unit. For example, the remote control unit RU and the medical remote operating personnel ROPS may be located in a remote operating room RS. The remote control unit RU may include a user interface (e.g., an input unit 41 and a further output unit, such as a display unit 42). The input unit 41 may be configured to capture a user input by the medical remote operating personnel ROPS. For example, the input unit 41 may be a keyboard and/or a button and/or a joystick and/or a touchpad and/or a microphone (e.g., for speech capture) and/or a camera (e.g., for capturing gestures). In one embodiment, the input unit 41 may be integrated in the local display unit 42 (e.g., when there is a resistive and/or capacitive input display). The remote control unit RU may also be configured to provide a remote control signal RCS to the remote manipulation unit according to the user input. The remote control unit RU may be configured (e.g., by the control signal CS) to control, according to the user input, the movement apparatus CR for robotic movement of the medical object MO. For example, the remote control unit RU may be configured to enable, adjust, or stop (e.g., according to the user input) the robotic movement of the medical object MO. The remote control unit RU may also be configured (e.g., by the control signal RCS) to control, according to the user input, the automatic injector INJ (e.g., to adjust an administration rate and/or dose and/or composition of the medication and/or to enable or stop the administration of the medication).

The capture unit may include at least one sensor EU (e.g., an optical and/or acoustic and/or electromagnetic and/or mechanical sensor) that is configured to capture state data of the object under examination 31 (e.g., a camera and/or a heart sensor and/or a respiratory sensor and/or a heart rate sensor and/or a temperature sensor). The state data includes information about the physiological state of the object under examination 31 (e.g., a physiological patient parameter). The state data may characterize quantitatively and/or qualitatively the (e.g., current) physiological state of the object under examination 31. The capture unit (e.g., the at least one sensor EU) may be located on the object under examination 31, in the object under examination 31, or spaced from the object under examination 31. In one embodiment, the capture unit may provide the state data to the provider unit PRVS (e.g., using a state signal S.EU).

The provider unit PRVS may also be configured to classify, based on the state data, the physiological state of the object under examination 31 into an expected state or a state that deviates therefrom. In a first operating state of the system, when the expected state is present, the remote manipulation unit may perform the at least one procedure step according to the remote control signal RCS. In a second operating state of the system, when the deviating state is present, the provider unit PRVS may provide a remote signal RSIG to the remote control unit RU and a local signal LSIG to the output unit ANW. In the second operating state, the output unit ANW may output a first workflow notice to the local operating personnel LOPS according to the local signal LSIG. In addition, in the second operating state and according to the remote signal RCS, the remote control unit may adjust degrees of freedom for the remote control of the remote manipulation unit, output a second workflow notice to the remote operating personnel ROPS, and/or provide an alternative remote control signal. The remote control unit RU may be located away from the remote manipulation unit in both operating states of the system.

In one embodiment, the provider unit PRVS may be configured to classify the physiological state of the object under examination 31 by comparing the state data with reference parameters, by a statistical analysis of the state data, by comparing the state data with historical state data of the object under examination 31, and/or by applying artificial intelligence to the state data.

In one embodiment, the state data may include medical image data and/or a physiological signal (e.g., a respiratory signal and/or an ECG signal) of the object under examination 31. In order to acquire the medical image data of the object under examination 31, the medical imaging device (e.g., the medical C-arm X-ray device IU) may be located in the local treatment room LS. The C-arm X-ray device IU may be communicatively coupled to the provider unit PRVS via a signal S.IU. In one embodiment, the C-arm X-ray device IU (e.g., the acquisition of the image data and/or a movement of the C-arm X-ray device IU) may be controlled remotely by a control signal CS from the remote control unit RU (e.g., according to a user input by the medical remote operating personnel ROPS). The provider unit PRVS may receive the medical image data using the signal S.IU, and may provide the medical image data to the remote control unit RU using the remote signal RSIG. The display unit 42 may be configured to output a graphical representation of the medical image data. For this purpose, the interface IF may receive the provider signal PS and may send a corresponding signal 26 to the display unit 42.

The provider unit PRVS may also be configured to identify, based on the state data, a cardiac arrest and/or cardiac fibrillation and/or a drop in blood pressure and/or a shock reaction and/or a panic attack and/or a stroke and/or a perforation and/or a hemorrhage and/or a vasospasm as a deviating state of the object under examination.

In one embodiment, the provider unit PRVS may also be configured to identify, based on the state data, specific local operating personnel and/or a configuration requirement including information about required materials and/or a required room space, and/or a further procedure step for stabilizing the object under examination 31. In addition, the provider unit PRVS may be configured to provide the local signal LSIG presenting information on the identification of the specific local operating personnel and/or the configuration requirement and/or the further procedure step. The output unit ANW may be configured to output the first workflow notice, which presents the identification of the specific local operating personnel and/or the configuration requirement and/or the further procedure step and/or an advice notice to the specific local operating personnel and/or to a reservation system for reserving the configuration requirement.

The remote control unit RU may also be configured to reduce the number of degrees of freedom for remote control of the remote manipulation unit or block the remote control of the remote manipulation unit, according to the remote signal RSIG.

In addition, the provider unit PRVS may be configured to identify, based on the state data, a further procedure step for the object under examination 31. The provider unit PRVS may also be configured to provide the remote signal RSIG presenting information on the identification of the further procedure step. The remote control unit RU may be configured to output the second workflow notice presenting the identification of the further procedure step, and/or to provide the alternative remote control signal for controlling the remote manipulation unit remotely to perform the further procedure step.

The system may also include a local input unit VINP. The local input unit VINP may be configured to capture and provide to the provider unit PRVS (e.g., using a signal S.VINP) a user input by the local operating personnel LOPS. The provider unit PRVS may also be configured to classify, according to the user input by the local operating personnel LOPS, the physiological state of the object under examination 31 as a deviating state.

Further, the provider unit PRVS may be configured to classify the physiological state of the object under examination 31 also based on the user input by the remote operating personnel ROPS.

In one embodiment, the capture unit may be further configured to capture protocol data from a medical device and/or from the remote manipulation unit and/or to capture a current procedure step. The provider unit PRVS may be configured, for example, to classify the physiological state of the object under examination 31 also based on the protocol data and/or the current procedure step.

Figure 2:
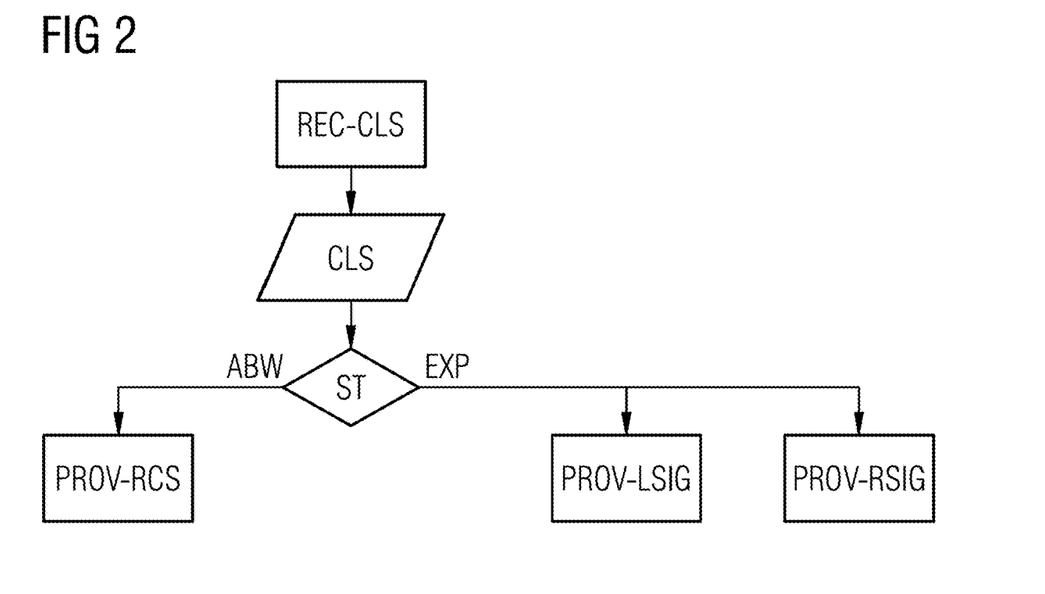
FIGS. 2 and 3 show schematic representations of different embodiments of a method.

FIG. 2 shows a schematic representation of one embodiment of a method for signal provision according to a physiological state of the object under examination 31. In this method, information CLS on a classification of the physiological state of the object under examination 31 is received. The classification may, for example, classify ST the state of the object under examination 31 as an expected state EXP or a state ABW that deviates therefrom. When the expected state EXP is present, the remote control signal RCS, which presents information on at least one procedure step, may be provided PROV-RCS to the remote manipulation unit. When the deviating state ABW is present, the local signal LSIG may be provided PROV-LSIG to the output unit ANW. In this case, a first workflow notice may be output by the output unit ANW to the local operating personnel LOPS according to the local signal LSIG. In addition, the remote signal RSIG may be provided PROV-RSIG to the remote control unit RU. The degrees of freedom for the remote control of the remote manipulation unit may be adjusted, a second workflow notice may be output to the remote operating personnel ROPS, and/or an alternative remote control signal may be provided.

Figure 3:
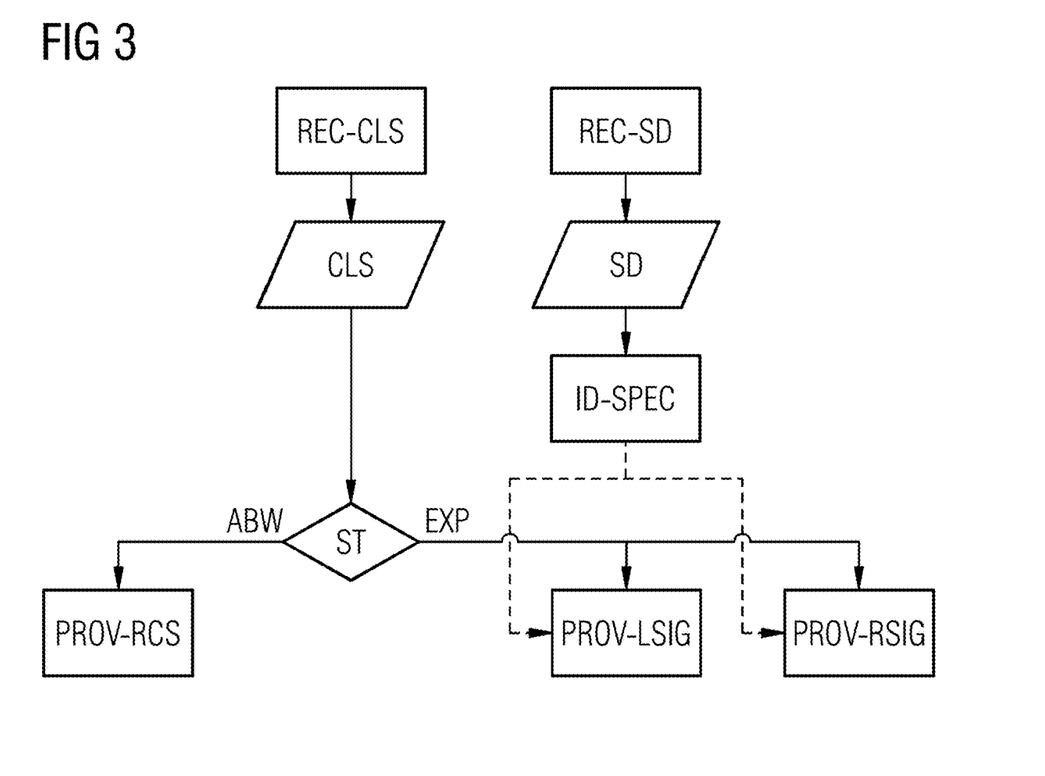

FIG. 3 shows schematically a further embodiment of the method. In this case, state data SD of the object under examination 31 that includes information about the physiological state of the object under examination 31 may be received REC-SD. Specific local operating personnel and/or a configuration requirement and/or a further procedure step for stabilizing the object under examination 31 may be identified ID-SPEC from the state data SD. When the deviating state ABW is present, the local signal LSIG may be provided which presents information on the identification of the specific local operating personnel and/or the configuration requirement and/or the further procedure step. In addition, the first workflow notice that presents the identification of the specific local operating personnel and/or the configuration requirement and/or the further procedure step and/or an advice notice to the specific local operating personnel and/or to a reservation system for reserving the configuration requirement may be output. In one embodiment, the number of degrees of freedom for remote control of the remote manipulation unit may be reduced, or the remote control of the remote manipulation unit may be blocked, according to the remote signal RSIG.

Further, the remote signal RSIG presenting information on the identification of the further procedure step may be provided. In addition, the second workflow notice presenting the identification of the further procedure step may be output, and/or the alternative remote control signal presenting information on the further procedure step may be provided to the remote manipulation unit.

The schematic representations contained in the described figures are not shown to scale in any way and do not depict relative sizes.

In the context of the present application, the expression "based on" may be understood, for example, in the sense of the expression "using." For example, any wording, according to which a first feature is produced (e.g., or obtained, defined, etc.) based on a second feature, does not exclude the possibility that the first feature is produced (e.g., or obtained, defined, etc.) based on a third feature.

The above methods described in detail and the presented apparatuses are merely embodiments that may be modified by a person skilled in the art in many ways without departing from the scope of the invention. In addition, the use of the indefinite article "a" or "an" does not rule out the possibility of there also being more than one of the features concerned. Likewise, the terms "unit" and "element" do not exclude the possibility that the components in question consist of a plurality of interacting sub-components, which may also be spatially distributed if applicable.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A system for monitoring a physiological state of an object under examination in remotely controlled procedures, the system comprising:
   a capture unit comprising a medical imaging device, at least one sensor, or the medical imaging device and the at least one sensor;
   a provider unit comprising one or more processors;
   a remote control unit;
   a remote manipulation unit; and
   an output unit,
   wherein the remote control unit is configured to:
      capture a user input by remote operating personnel; and
      provide a remote control signal to the remote manipulation unit according to the user input,
   wherein the remote manipulation unit is configured to perform, at the object under examination, at least one procedure step according to the remote control signal,
   wherein the capture unit is configured to capture and provide state data of the object under examination to the provider unit,
   wherein the state data comprises information about the physiological state of the object under examination,
   wherein the one or more processors of the provider unit are configured to classify, based on the state data, the physiological state of the object under examination into an expected state and a state that deviates therefrom,
   wherein in a first operating state of the system, when the expected state is present, the remote manipulation unit is configured to perform the at least one procedure step according to the remote control signal,
   wherein in a second operating state of the system, when the deviating state is present:
      the provider unit is configured to provide a remote signal to the remote control unit and a local signal to the output unit;
      the output unit is configured to output a first workflow notice according to the local signal to local operating personnel; and
      according to the remote signal, the remote control unit is configured to adjust degrees of freedom for the remote control of the remote manipulation unit, output a second workflow notice to the remote operating personnel, provide an alternative remote control signal, or any combination thereof, and
   wherein the remote control unit is located away from the remote manipulation unit in both the first operating state and the second operating state of the system.

2. The system of claim 1, wherein the provider unit is further configured to classify the physiological state of the object under examination, the provider unit being configured to classify the physiological state of the object under examination comprising the provider unit being configured to:
   compare the state data with reference parameters;
   classify the physiological state by a statistical analysis of the state data;
   compare the state data with historical state data of the object under examination;
   applying artificial intelligence to the state data;
   or any combination thereof.

3. The system of claim 1, wherein the state data comprises medical image data, a physiological signal, an electrocardiogram (ECG) signal, or any combination thereof of the object under examination, and
   wherein the provider unit is further configured to identify, based on the state data, a cardiac arrest, cardiac fibrillation, a drop in blood pressure, a shock reaction, a panic attack, a stroke, a perforation, a hemorrhage, a vasospasm, or any combination thereof as a deviating state of the object under examination.

4. The system of claim 1, wherein the provider unit is further configured to:
   identify, based on the state data, specific local operating personnel, a configuration requirement comprising information about required materials, a required room space, a further procedure step for stabilizing the object under examination, or any combination thereof;
   provide the local signal presenting information on the identification of the specific local operating personnel, the configuration requirement, the further procedure step, or any combination thereof, and
   wherein the output unit is further configured to:
      output the first workflow notice presenting the identification of the specific local operating personnel, the configuration requirement, the further procedure step, or any combination thereof;
output an advice notice to the specific local operating personnel, to a reservation system for reserving the configuration requirement, or to the specific local operating personnel and to the reservation system for reserving the configuration requirement; or
a combination thereof.

5. The system of claim 1, wherein the remote control unit is further configured to reduce the number of degrees of freedom for remote control of the remote manipulation unit or block the remote control of the remote manipulation unit, according to the remote signal.

6. The system of claim 1, wherein the provider unit is further configured to:
identify, based on the state data, a further procedure step for stabilizing the object under examination; and
provide the remote signal presenting information on the identification of the further procedure step, and
wherein the remote control unit is further configured to:
output the second workflow notice presenting the identification of the further procedure step;
provide the alternative remote control signal for controlling the remote manipulation unit remotely to perform the further procedure step; or
a combination thereof.

7. The system of claim 1, further comprising a local input unit configured to capture and provide to the provider unit a user input by the local operating personnel,
wherein the provider unit is further configured to classify, according to the user input by the local operating personnel, the physiological state of the object under examination as a deviating state.

8. The system of claim 1, wherein the provider unit is further configured to classify the physiological state of the object under examination also based on the user input by the remote operating personnel.

9. The system of claim 1, wherein the capture unit is further configured to:
capture protocol data from a medical device, from the remote manipulation unit, or from the medical device and the remote manipulation unit;
capture a current procedure step; or
a combination thereof, and
wherein the provider unit is further configured to classify the physiological state of the object under examination also based on the protocol data, the current procedure step, or the protocol data and the current procedure step.

10. The system of claim 1, wherein the remote manipulation unit comprises a medical imaging device, a medical treatment device, a movement apparatus, or any combination thereof for robotic movement of a medical object.

11. A method for signal provision according to a physiological state of an object under examination, the method comprising:
receiving information on a classification of the physiological state of the object under examination, wherein the classification classifies a state of the object under examination as an expected state or a state that deviates from the expected state;
when the expected state is present, providing a remote control signal that presents information on at least one procedure step to a remote manipulation unit; and
when the deviating state is present:
providing a local signal to an output unit comprising a display, a loudspeaker, a motor, or any combination thereof; and
outputting, by the display, the loudspeaker, the motor, or the respective combination thereof, a first workflow notice by the output unit to local operating personnel according to the local signal;
providing a remote signal to a remote control unit; and
adjusting degrees of freedom for the remote control of the remote manipulation unit, outputting a second workflow to remote operating personnel, providing an alternative remote control signal, or any combination thereof.

12. The method of claim 11, further comprising:
receiving state data of the object under examination, the state data comprising information about the physiological state of the object under examination; and
identifying specific local operating personnel, a configuration requirement comprising information about required materials, a required room space, or the required materials and the required room space, a further procedure step for stabilizing the object under examination, or any combination thereof using the state data,
wherein, when the deviating state is present, the method further comprises:
providing the local signal presenting information on the identification of the specific local operating personnel, the configuration requirement, the further procedure step, or any combination thereof; and
outputting the first workflow notice presenting the identification of the specific local operating personnel, the configuration requirement, the further procedure step, an advice notice to the specific local operating personnel, to a reservation system for reserving the configuration requirement, or to the specific local operating personnel and to the reservation system for reserving the configuration requirement, or any combination thereof.

13. The method of claim 11, wherein the number of degrees of freedom for remote control of the remote manipulation unit is reduced, or the remote control of the remote manipulation unit is blocked, according to the remote signal.

14. The method of claim 11, further comprising:
receiving state data of the object under examination that comprises information about the physiological state of the object under examination;
identifying a further procedure step for stabilizing the object under examination using the state data, wherein the remote signal is provided presenting information on the identification of the further procedure step; and
outputting the second workflow notice presenting the identification of the further procedure step, providing the alternative remote control signal presenting information on the further procedure step to the remote manipulation unit, or a combination thereof.

15. In a non-transitory computer-readable storage medium that stores instructions executable by one or more processors for signal provision according to a physiological state of an object under examination, the instructions comprising:
receiving information on a classification of the physiological state of the object under examination, wherein the classification classifies a state of the object under examination as an expected state or a state that deviates from the expected state;

when the expected state is present, providing a remote control signal that presents information on at least one procedure step to a remote manipulation unit; and when the deviating state is present:
providing a local signal to an output unit comprising a display, a loudspeaker, a motor, or any combination thereof; and
outputting, by the display, the loudspeaker, the motor, or the respective combination thereof, a first workflow notice by the output unit to local operating personnel according to the local signal;
providing a remote signal to a remote control unit; and
adjusting degrees of freedom for the remote control of the remote manipulation unit, outputting a second workflow to remote operating personnel, providing an alternative remote control signal, or any combination thereof.

16. The non-transitory computer-readable storage medium of claim 15, wherein the instructions further comprise:
receiving state data of the object under examination, the state data comprising information about the physiological state of the object under examination; and
identifying specific local operating personnel, a configuration requirement comprising information about required materials, a required room space, or the required materials and the required room space, a further procedure step for stabilizing the object under examination, or any combination thereof using the state data,
wherein, when the deviating state is present, the instructions further comprise:
providing the local signal presenting information on the identification of the specific local operating personnel, the configuration requirement, the further procedure step, or any combination thereof; and
outputting the first workflow notice presenting the identification of the specific local operating personnel, the configuration requirement, the further procedure step, an advice notice to the specific local operating personnel, to a reservation system for reserving the configuration requirement, or to the specific local operating personnel and to the reservation system for reserving the configuration requirement, or any combination thereof.

17. The non-transitory computer-readable storage medium of claim 15, wherein the number of degrees of freedom for remote control of the remote manipulation unit is reduced, or the remote control of the remote manipulation unit is blocked, according to the remote signal.

18. The non-transitory computer-readable storage medium of claim 15, wherein the instructions further comprise:
receiving state data of the object under examination that comprises information about the physiological state of the object under examination;
identifying a further procedure step for stabilizing the object under examination using the state data, wherein the remote signal is provided presenting information on the identification of the further procedure step; and
outputting the second workflow notice presenting the identification of the further procedure step, providing the alternative remote control signal presenting information on the further procedure step to the remote manipulation unit, or a combination thereof.

* * * * *